(12) United States Patent
Tsutsui (10) Patent No.: US 8,374,301 B2
(45) Date of Patent: Feb. 12, 2013

(54) WIRELESS RELAY APPARATUS AND WIRELESS RELAY METHOD

(75) Inventor: Masafumi Tsutsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 12/966,392

(22) Filed: Dec. 13, 2010

(65) Prior Publication Data

US 2011/0158294 A1 Jun. 30, 2011

(30) Foreign Application Priority Data

Dec. 28, 2009 (JP) ................................ 2009-297671

(51) Int. Cl.
*H04B 7/10* (2006.01)
(52) U.S. Cl. ........................ 375/347; 375/211
(58) Field of Classification Search .................. 375/211, 375/267, 299, 346–349
See application file for complete search history.

(56) References Cited

U.S. PATENT DOCUMENTS

| 7,561,632 B1 | 7/2009 | van Zelst et al. | |
| 2004/0085239 A1 | 5/2004 | Ukena et al. | |
| 2005/0190821 A1 | 9/2005 | Fujii et al. | |
| 2006/0040615 A1 | 2/2006 | Mohamadi | |
| 2009/0033555 A1* | 2/2009 | Niu et al. | 342/372 |
| 2011/0150119 A1* | 6/2011 | Kent et al. | 375/267 |

FOREIGN PATENT DOCUMENTS

| EP | 1 564 911 | 8/2005 |
| JP | 2004-135263 | 4/2004 |
| JP | 2005-229524 | 8/2005 |

OTHER PUBLICATIONS

Extended European Search Report with Annex, issued by European Patent Office for corresponding European Patent Application No. 10196938.4, dated Apr. 26, 2011.

* cited by examiner

*Primary Examiner* — Emmanuel Bayard
(74) *Attorney, Agent, or Firm* — Myers Wolin, LLC (57) ABSTRACT

A wireless relay apparatus relaying wireless communication between a transmission station and a receiving station includes M (M is an integer >1) receiving antennas receiving a radio signal from the transmission station, a signal processing section performing orthogonal transformation and phase rotation on M received signals received by each of the receiving antennas as an input signal so as to obtain M output signals having a same average power level, and M transmission antennas individually transmitting the M output signals obtained by the signal processing section to the receiving station.

12 Claims, 12 Drawing Sheets

WIRELESS RELAY APPARATUS AND WIRELESS RELAY METHOD

CROSS-REFERENCE TO RELATED APPLICATIONS

This application is based upon and claims the benefit of priority of the prior Japanese Patent Application No. 2009-297671, filed on Dec. 28, 2009, the entire contents of which are incorporated herein by reference.

FIELD

The present invention relates to a relay technique for wireless communication using a plurality of antennas.

BACKGROUND

In a wireless communication system, when a mobile station is located in an indoor or outdoor weak electromagnetic field, wireless communication between a base station and the mobile station is sometimes difficult. In order to take measures to deal with this situation, a repeater is often disposed as a wireless relay apparatus amplifying and relaying a downlink signal transmitted from a base station and an uplink signal transmitted from a mobile station. By disposing a repeater, it is possible to expand cell coverage (a service area) at a relatively low cost. To date, the number of transmission antennas and receiving antennas in wireless communications between a base station and a repeater and between a repeater and a mobile station have been one, respectively. That is to say, Single Input Single Output (SISO) configurations have been employed.

In this regard, various proposals have been made for wireless relay. For example, Japanese Laid-open Patent No. 2005-229524 has been proposed for a wireless relay system in which a radio signal from a first radio station is relayed by a wireless relay apparatus to be transmitted to a second radio station. In this related-art wireless relay system, the wireless relay apparatus determines the amount of phase correction of the relay signal based on channel information on a transmission path between the first radio station, the second radio station, and the wireless relay apparatus, and corrects a phase of the relay signal based on the amount of phase correction.

Also, in a wireless communication system, Multiple Input Multiple Output (MIMO) is known as a transmission method for increasing transmission rate using multistream with a limited frequency band. In MIMO, a transmission apparatus and a receiving apparatus are provided with a plurality of antennas, respectively. And transmission symbols (multistream) transmitted from the plurality of antennas of the transmission apparatus are mixed on a propagation path, and are received by the plurality of antennas of the receiving apparatus. It is known that if the number of antennas is assumed to be constant, the smaller the correlation between individual streams, the larger the communication capacity by MIMO becomes.

Figure 1:
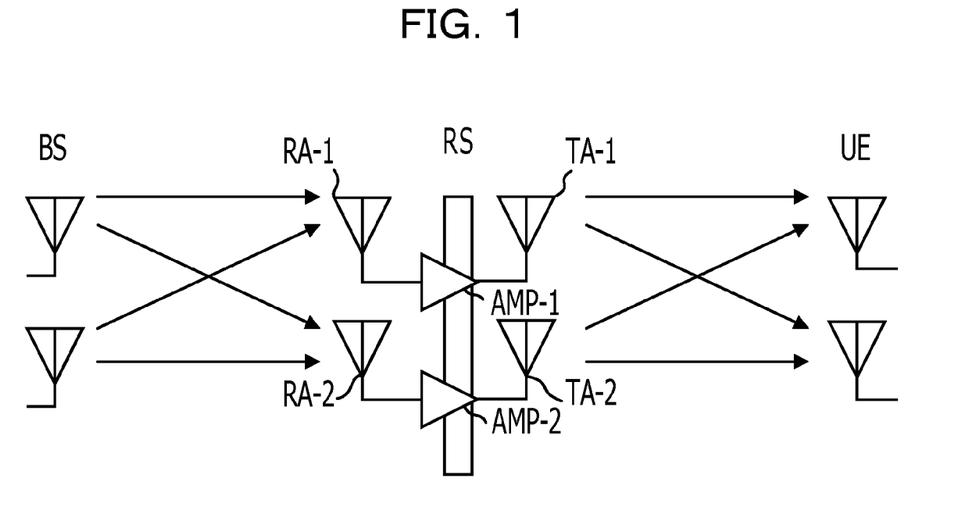
FIG. 1 illustrates an example of a wireless communication system including a MIMO repeater.

Incidentally, if it is assumed that a repeater (hereinafter referred to as a "MIMO repeater") which relays multistream by MIMO, for example a 2×2 MIMO repeater, is provided, a general configuration of an overall wireless communication system is thought to be illustrated in FIG. 1. In FIG. 1, a relay station (RS) as a MIMO repeater generally has a configuration in which repeaters with a related-art SISO configuration are disposed in parallel.

FIG. 1 illustrates an example of wireless relay of a downlink signal from a base station (BS) as a transmission station to a mobile station, or User Equipment (UE), as a receiving station. Here, the relay station as a wireless relay apparatus includes two receiving antennas RA-1 and RA-2, which receive signals from the base station, and two transmission antennas TA-1 and TA-2, which transmit signals to the mobile station. As illustrated in FIG. 1, the signals transmitted from the two transmission antennas of the base station are mixed on a propagation path between the base station and the relay station, and are received by the two receiving antennas RA-1 and RA-2 of the relay station. In the relay station, the received signals by the receiving antennas RA-1 and RA-2 are amplified by power amplifiers AMP-1 and AMP-2, and are transmitted from the transmission antennas TA-1 and TA-2. The signals transmitted from the two transmission antennas TA-1 and TA-2 of the relay station are mixed on a propagation path between the relay station and the mobile station, and are received by two receiving antennas of the mobile station.

For the MIMO repeater, it is demanded that the sum total of transmission power from a plurality of transmission antennas be increased, and a service area for the mobile station be expanded. In order to increase the sum total of transmission power from the plurality of transmission antennas, the average input power (in FIG. 1, the average received power) to the individual power amplifiers connected to the plurality of transmission antennas ought to be made equal. This is because all the power amplifiers may be used at an operating point with high output and high efficiency. If there is a difference in the average input power of the individual power amplifiers, the operating points of the individual power amplifiers are restricted by a power amplifier having the largest average input power.

However, if a MIMO repeater is configured only by disposing repeaters having a related-art SISO configuration as illustrated in FIG. 1, it is thought that level differences arise in the average received power obtained from the individual receiving antennas of the MIMO repeater. The level difference in the average received power is caused by variations of the receiving characteristics of a plurality of receiving systems including the receiving antennas, restrictions of the disposition positions of the individual receiving antennas, etc. It is troublesome to manage the receiving characteristics of a plurality of receiving systems including the receiving antennas, and to adjust the disposition positions of the individual receiving antennas so that level differences will not arise in the average received power obtained from the individual receiving antennas.

SUMMARY

According to an aspect of the invention, a wireless relay apparatus relaying wireless communication between a transmission station and a receiving station includes M (M is an integer >1) receiving antennas receiving a radio signal from the transmission station, a signal processing section performing orthogonal transformation and phase rotation on M received signals received by each of the receiving antennas as an input signal so as to obtain M output signals having a same average power level, and M transmission antennas individually transmitting the M output signals obtained by the signal processing section to the receiving station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

1. First Embodiment

In the following, a description will be given of a wireless relay system according to a first embodiment.

1.1 Wireless Relay System

Figure 2:
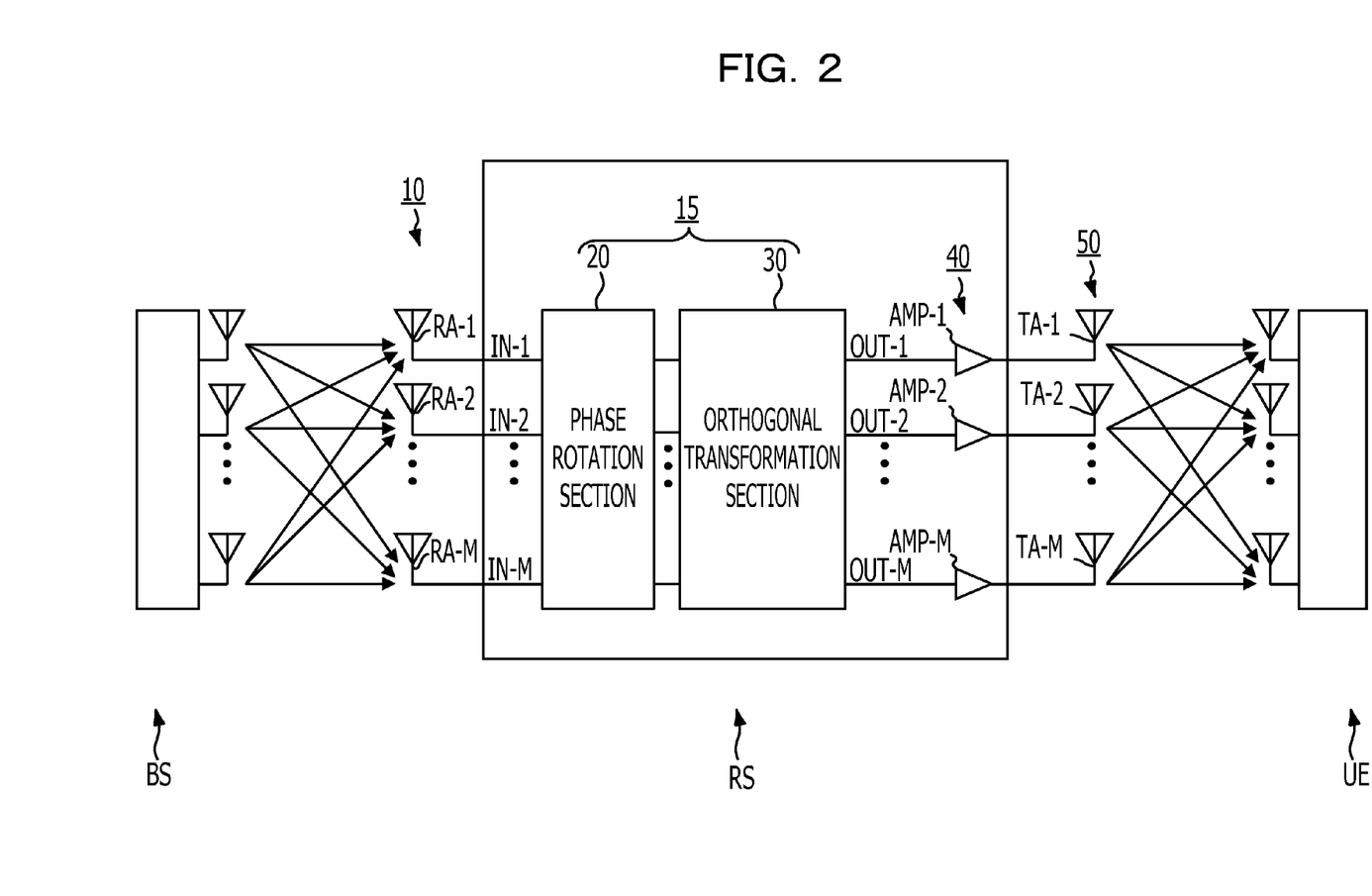
FIG. 2 illustrates an example of a wireless relay system according to a first embodiment.

FIG. 2 illustrates a configuration of a wireless relay system according to the present embodiment. In the wireless relay system illustrated in FIG. 2, a relay station (RS), as a wireless relay apparatus, relays wireless communication between a base station (BS) and a mobile station (UE: User Equipment). The wireless communication between the base station and the mobile station is performed by MIMO, and the relay station functions as a MIMO repeater.

In this regard, FIG. 2 illustrates, as an example, the case in which the relay station performs wireless relay of a downlink signal from the base station as a transmission station to the mobile station as a receiving station. In the present embodiment, a description will only be given of a wireless relay method of the downlink signal. However, the same wireless relay method may be applied to an uplink signal.

1.2 Configuration of Relay Station

In the following, a description will be given of a configuration of a relay station according to the present embodiment with reference to FIG. 2.

As illustrated in FIG. 2, the relay station according to the present embodiment includes a receiving antenna group 10, a phase rotation section 20, an orthogonal transformation section 30, a power amplifier group 40, and a transmission antenna group 50. The receiving antenna group 10 has M (M>1) receiving antennas RA-1, RA-2, . . . , and RA-M, which receive signals from the base station. The power amplifier group 40 has M power amplifiers AMP-1, AMP-2, . . . , and AMP-M. The transmission antenna group 50 has M (M>1) transmission antennas TA-1, TA-2, . . . , and TA-M, which transmit signals to the mobile station.

In this relay station, the phase rotation section 20 and the orthogonal transformation section 30 constitute a signal processing section 15 for performing signal processing on the received signals.

As illustrated in FIG. 2, signals that are transmitted from a plurality of transmission antennas of the base station, for example, of the same number as the M receiving antennas of the relay station, are mixed on a propagation path between the base station and the relay station, and are received by M receiving antennas RA-1, RA-2, . . . , and RA-M of the relay station. In FIG. 2, each of the received signals of the M receiving antennas RA-1, RA-2, . . . , RA-M becomes a corresponding one of M input signals IN-1, IN-2, . . . , and IN-M.

Here, the average received power by the received signals obtained from the individual receiving antennas includes level differences because of variations of the receiving characteristics of a plurality of the receiving systems including the receiving antennas, and restrictions of the disposition positions of the individual receiving antennas, etc. Thus, in a relay station according to the present embodiment, a signal processing section 15 performs phase rotation on the individual input signals, and then performs orthogonal transformation on the signals so as to generate output signals OUT-1, OUT-2, . . . , and OUT-M having the same average power level.

In FIG. 2, the phase rotation section 20 performs phase rotation processing in order to perform phase rotation on each of the input signals by a desired amount. Further, the orthogonal transformation section 30 performs orthogonal transformation processing on the M signals having been subjected to the phase rotation to generate the M output signals.

Here, in MIMO, mixed-path propagation is scheduled between the base station and the mobile station, and thus although the relay station located in the middle of the propagation path performs orthogonal transformation processing, on the multistream, there is no influence on the MIMO decoding of the mobile station. Also, if the relay station does not perform the orthogonal transformation on the individual input signals, and tries any distribution so that the individual output signals become equal, the correlation between the individual output signals becomes high, and the MIMO communication capacity (or referred to as a "channel capacity") might be deteriorated. Thus, in the relay station according to the present embodiment, each input signal is subjected to the orthogonal transformation processing so that the MIMO communication capacity will not be decreased.

After undergoing the orthogonal transformation processing, the M input signals are subjected to phase rotation by desired amounts, so that the signals individually come to be adjusted to have the average power level, that is to say, to have equal power.

As an example, the processing performed by the signal processing section 15 on M input signals is described by a matrix using the following Expression 1.

[Expression 1]

$$\frac{1}{\sqrt{M}} \begin{bmatrix} 1 & 1 & 1 & \cdots & 1 \\ 1 & e^{-j\frac{2\pi}{M}} & e^{-j\frac{2\pi}{M}2} & \cdots & e^{-j\frac{2\pi}{M}(M-1)} \\ 1 & e^{-j\frac{2\pi}{M}2} & e^{-j\frac{2\pi}{M}4} & \cdots & e^{-j\frac{2\pi}{M}2(M-1)} \\ \vdots & \vdots & \vdots & \ddots & \vdots \\ 1 & e^{-j\frac{2\pi}{M}(M-1)} & e^{-j\frac{2\pi}{M}2(M-1)} & \cdots & e^{-j\frac{2\pi}{M}(M-1)^2} \end{bmatrix} \quad (1)$$

$$\begin{bmatrix} 1 & 0 & 0 & \cdots & 0 \\ 0 & e^{j\phi_1} & 0 & \cdots & 0 \\ 0 & 0 & e^{j\phi_2} & \cdots & 0 \\ \vdots & \vdots & \vdots & \ddots & \vdots \\ 0 & 0 & 0 & \cdots & e^{j\phi_{M-1}} \end{bmatrix}$$

In the above Expression 1, the matrix given by the following Expression 2 represents a phase rotation matrix, and corresponds to the signal processing by the phase rotation section 20. In the above Expression 1, the matrix given by the following Expression 3 represents an orthogonal transformation matrix, and corresponds to the signal processing by the orthogonal transformation section 30. In this regard, this orthogonal transformation matrix is an M-point discrete Fourier transform matrix (DFT matrix).

[Expression 2]

$$\begin{bmatrix} 1 & 0 & 0 & \cdots & 0 \\ 0 & e^{j\phi_1} & 0 & \cdots & 0 \\ 0 & 0 & e^{j\phi_2} & \cdots & 0 \\ \vdots & \vdots & \vdots & \ddots & \vdots \\ 0 & 0 & 0 & \cdots & e^{j\phi_{M-1}} \end{bmatrix} \quad (2)$$

[Expression 3]

$$\frac{1}{\sqrt{M}} \begin{bmatrix} 1 & 1 & 1 & \cdots & 1 \\ 1 & e^{-j\frac{2\pi}{M}} & e^{-j\frac{2\pi}{M}2} & \cdots & e^{-j\frac{2\pi}{M}(M-1)} \\ 1 & e^{-j\frac{2\pi}{M}2} & e^{-j\frac{2\pi}{M}4} & \cdots & e^{-j\frac{2\pi}{M}2(M-1)} \\ \vdots & \vdots & \vdots & \ddots & \vdots \\ 1 & e^{-j\frac{2\pi}{M}(M-1)} & e^{-j\frac{2\pi}{M}2(M-1)} & \cdots & e^{-j\frac{2\pi}{M}(M-1)^2} \end{bmatrix} \quad (3)$$

In the matrices given by the above-described Expression 1 and Expression 2, the amounts of phase rotation for the second to the M-th input signals, out of the first to the M-th are assumed to be $\phi_1$ to $\phi_{M-1}$. In this regard, in the matrices given in the above-described Expression 1 and Expression 2, any relationships may be made between the first to the M-th input signals and individual receiving antennas out of the M receiving antennas.

The M power amplifiers AMP-1, AMP-2, . . . , and AMP-M of the power amplifier group 40 amplify the output signals OUT-1, OUT-2, . . . , and OUT-M of the signal processing section 15, respectively. Each of the output signals of the signal processing section 15 has the same average power level by the operation of the signal processing section 15, and thus each of the power amplifiers may be set to have the most efficient common operation point, respectively. In general, power amplifiers are said to be more efficient as they produce a higher output and are said to have an operation point producing the most efficient high output. Accordingly, by setting the above-described operation point, the sum total of the transmission power generated by the power amplifier group 40 becomes large.

The signal amplified by each power amplifier is transmitted from a corresponding one of the transmission antennas TA-1, TA-2, . . . , and TA-M. The transmission signals are mixed on the propagation path between the relay station and the mobile station, and are received by the plurality of receiving antennas of the mobile station.

1.3 Control in Relay Station

Next, a description will be given of control of the amount of phase rotation in the signal processing section 15 of the relay station according to the present embodiment. For a method of controlling the amount of phase rotation, any one of the following may be employed: (A) Feed-forward control, (B) Feedback control, or (C) Combination of feed-forward control and feedback control. Each control of (A) to (C) may be suitably selected based on the system response, stability, etc., in the signal processing section 15.

A. Feed-Forward Control

Referring to FIG. 2 again, if feed-forward control is employed as a control method of the amount of phase rotation, the signal processing section 15 calculates the amounts of phase rotation $\phi_1$ to $\phi_{M-1}$ in the above-described Expression 1 in sequence based on the M input signals IN-1, IN-2, . . . , and IN-M. Here, first, the first column of the phase rotation matrix in Expression 1 does not include variables of the amount of phase rotation, and thus a target average power level is obtained based on the first input signal. Next, $\phi_1$ to $\phi_{M-1}$ are calculated such that the average power level of the output signals calculated by Expression 1 on the second to the M-th input signals is equal to the target average power level. This is equivalent to solving (M−1) simultaneous equations.

B. Feedback Control

Figure 3:
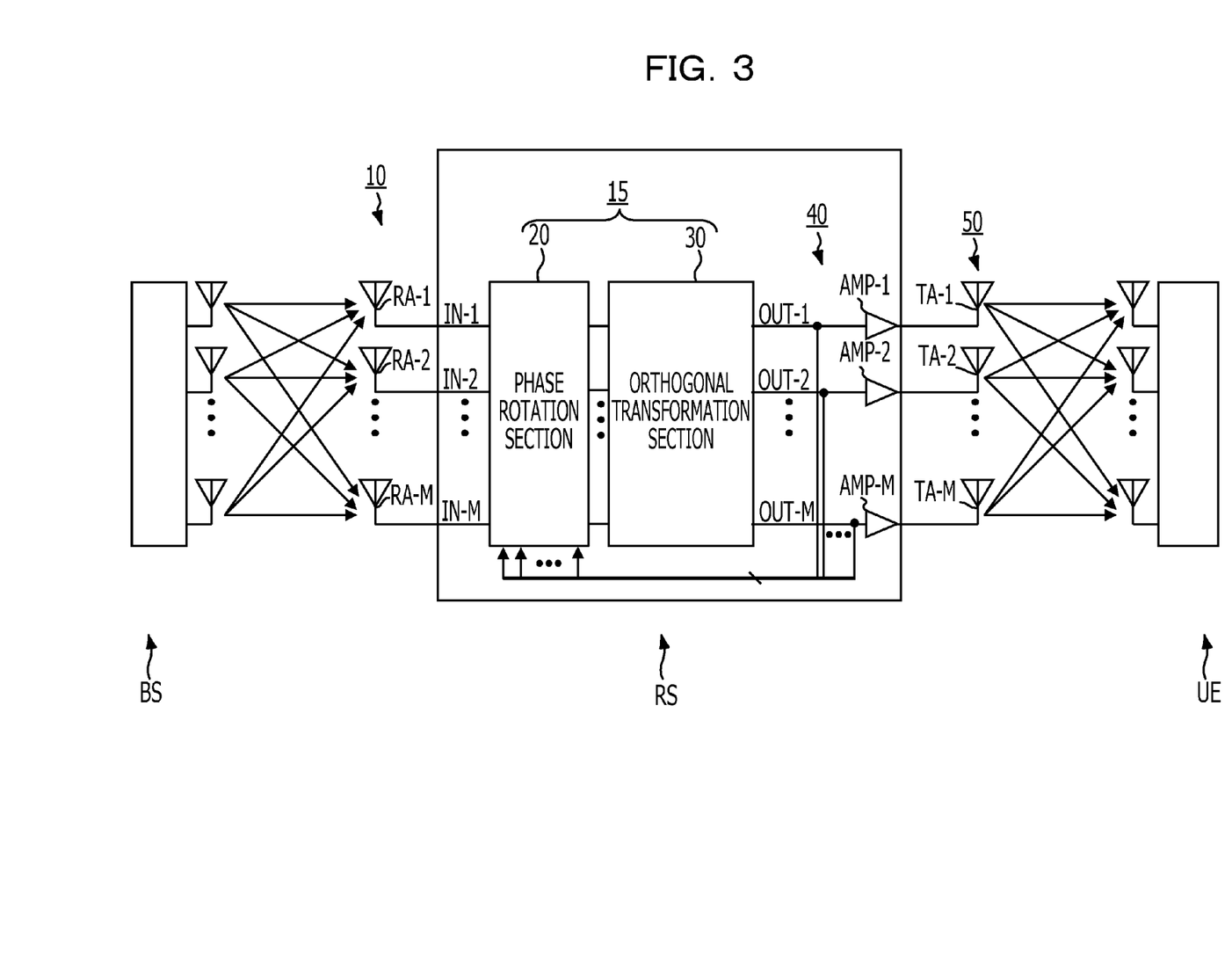
FIG. 3 illustrates an example of a relay station in the case of employing feedback control as a method of controlling the amount of phase rotation in the first embodiment.

FIG. 3 illustrates a configuration of a relay station when feedback control is employed as a control method of the amount of phase rotation. As illustrated in FIG. 3, in the feedback control, the output signals OUT-1, OUT-2, . . . , and OUT-M of the signal processing section 15 are fed back to the phase rotation section 20. Here, first, the first column of the phase rotation matrix in Expression 1 does not include variables of the amount of phase rotation, and thus a target average power level is obtained based on the first input signal. Next, the values of $\phi_1$ to $\phi_{M-1}$ are controlled such that a difference between the power level of the output signals calculated by Expression 1 on the second to the M-th input signals and the average power level becomes zero.

C. Combination of Feed-Forward Control and Feedback Control

FIG. 3 also illustrates a configuration of a relay station when feed-forward control and feedback control are used in combination as a control method of the amount of phase rotation. With only feed-forward control, it might occur that not all the average power levels of the output signals match because of variations of the characteristics of the receiving system, etc. Thus, in the combination of feed-forward control and feedback control, $\phi_1$ to $\phi_{M-1}$ are obtained basically by the feed-forward control to perform initial settings, and the feedback control is complementarily used. Also, by the combination of feed-forward control and feedback control, there are advantages of the stability in control over the case of using only feedback control.

As described above, by a relay station according to the present embodiment, the M received signals received by each of the receiving antennas are subjected to orthogonal transformation and phase rotation so that the M output signals having the same average power level are obtained. Accordingly, it is possible to set each of the power amplifiers power-amplifying a corresponding output signal to have an operation point producing the most efficient high output. Accordingly, the sum total of the transmission power of the relay station becomes large, and thus it is possible to enlarge a relay-allowed area of the receiving station (mobile station in this embodiment).

In this regard, in the present embodiment, a method of relaying a signal wirelessly by a relay station is disclosed.

That is to say, the method of relaying a signal wirelessly includes:

M (M is an integer >1) receiving antennas RA-1, RA-2, . . . , and RA-M of the wireless relay apparatus receiving a radio signal from a base station;

the wireless relay apparatus performing orthogonal transformation and phase rotation on M received signals received by each of the receiving antennas as input signals IN-1, IN-2, . . . , and IN-M so as to obtain M output signals OUT-1, OUT-2, . . . , and OUT-M having a same average power level; and M transmission antennas TA-1, TA-2, . . . , and TA-M of the wireless relay apparatus transmitting the M output signals, respectively, to the receiving station.

2. Second Embodiment

In the following, a description will be given of a relay station according to a second embodiment.

In the second embodiment, a description will be given of an example of a specific configuration of the signal processing section 15 when M=2 to 4. In this regard, in a downlink of LTE (Long Term Evolution), which is a next-generation mobile communication standard, it is scheduled that up to 4×4 MIMO (namely M=4) will be supported.

2.1 Example of Configuration when M=2

If M=2, the above-described Expression 1 may be expressed as the following Expression 4.

[Expression 4]

$$\frac{1}{\sqrt{2}}\begin{bmatrix} 1 & 1 \\ 1 & -1 \end{bmatrix}\begin{bmatrix} 1 & 0 \\ 0 & e^{j\phi_1} \end{bmatrix} \quad (4)$$

Figure 4:
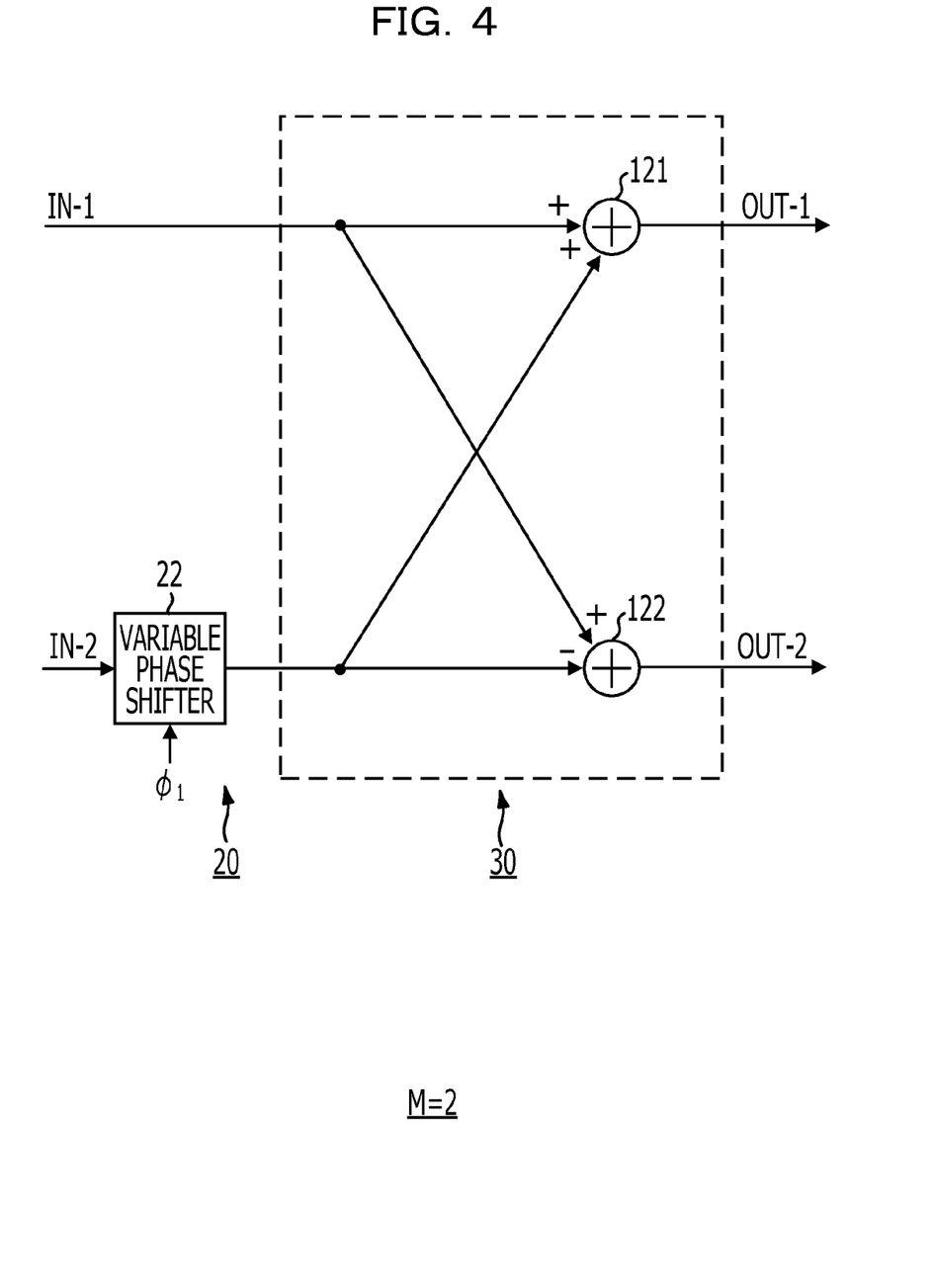
FIG. 4 illustrates an example of a configuration of a signal processing section of a relay station when M=2 in a second embodiment.

In order to achieve the above-described Expression 4, the signal processing section 15 of a relay station according to the present embodiment may employ an example of a configuration as illustrated in FIG. 4. In the signal processing section 15 illustrated in FIG. 4, a phase rotation section 20 includes a variable phase shifter 22, and an orthogonal transformation section 30 includes an adder 121 and a subtractor 122.

The amount of phase rotation $\phi_1$ is given to the variable phase shifter 22 as a control result described in the first embodiment, and the phase of the input signal IN-2 is rotated by the amount of phase rotation $\phi_1$.

The adder 121 adds the input signal IN-1 and the input signal IN-2 having been subjected to the phase rotation to generate an output signal OUT-1. The subtractor 122 subtracts the input signal IN-2 having been subjected to the phase rotation from the input signal IN-1 to generate an output signal OUT-2.

2.2 Example of Configuration when M=3

In the case of M=3, the above-described Expression 1 is expressed as the following Expression 5.

[Expression 5]

$$\frac{1}{\sqrt{3}}\begin{bmatrix} 1 & 1 & 1 \\ 1 & e^{-j120°} & e^{j120°} \\ 1 & e^{j120°} & e^{-j120°} \end{bmatrix}\begin{bmatrix} 1 & 0 & 0 \\ 0 & e^{j\phi_1} & 0 \\ 0 & 0 & e^{j\phi_2} \end{bmatrix} \quad (5)$$

Figure 5:
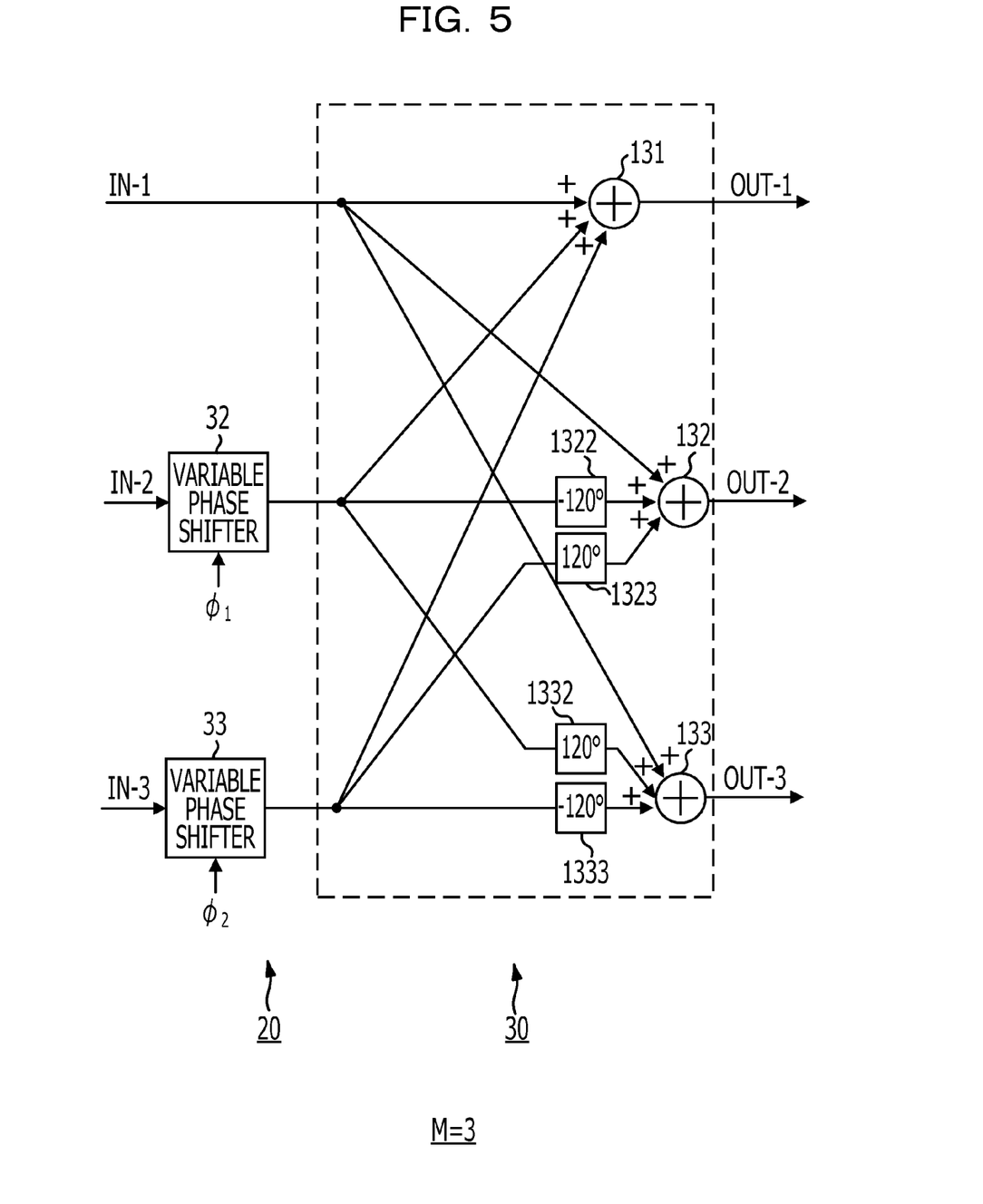
FIG. 5 illustrates an example of a configuration of a signal processing section of the relay station when M=3 in the second embodiment.

In order to achieve the above-described Expression 5, the signal processing section 15 of a relay station according to the present embodiment may employ an example of a configuration illustrated in FIG. 5.

In the signal processing section 15 illustrated in FIG. 5, the phase rotation section 20 includes a variable phase shifter 32 and a variable phase shifter 33. The orthogonal transformation section 30 includes phase shifters 1322, 1323, 1332, and 1333, and calculation units 131, 132, and 133.

The amount of phase rotation $\phi_1$ is given to the variable phase shifter 32 as a control result described in the first embodiment, and the phase of the input signal IN-2 is rotated by the amount of phase rotation $\phi_1$. The amount of phase rotation $\phi_2$ is given to the variable phase shifter 33 as a control result described in the first embodiment, and the phase of the input signal IN-3 is rotated by the amount of phase rotation $\phi_2$.

The phase shifter 1322 further performs phase rotation by −120 degrees on the input signal IN-2 having been subjected to the phase rotation performed by the variable phase shifter 32. The phase shifter 1323 further performs phase rotation by +120 degrees on the input signal IN-3 having been subjected to the phase rotation performed by the variable phase shifter 33. The phase shifter 1332 further performs phase rotation by +120 degrees on the input signal IN-2 having been subjected to the phase rotation performed by the variable phase shifter 32. The phase shifter 1333 further performs phase rotation by −120 degrees on the input signal IN-3 having been subjected to the phase rotation performed by the variable phase shifter 33.

The calculation unit 131 is an adder, and adds the input signal IN-1, the output signal of the variable phase shifter 32, and the output signal of the variable phase shifter 33 to generate an output signal OUT-1. The calculation unit 132 is an adder, and adds the input signal IN-1, the output signal of the phase shifter 1322, and the output signal of the phase shifter 1323 to generate an output signal OUT-2. The calculation unit 133 is an adder, and adds the input signal IN-1, the output signal of the phase shifter 1332, and the output signal of the phase shifter 1333 to generate an output signal OUT-3.

2.3 Example of Configuration when M=4

In the case of M=4, the above-described Expression 1 is expressed as the following Expression 6.

[Expression 6]

$$\frac{1}{2}\begin{bmatrix} 1 & 1 & 1 & 1 \\ 1 & -j & -1 & j \\ 1 & -1 & 1 & -1 \\ 1 & j & -1 & -j \end{bmatrix}\begin{bmatrix} 1 & 0 & 0 & 0 \\ 0 & e^{j\phi_1} & 0 & 0 \\ 0 & 0 & e^{j\phi_2} & 0 \\ 0 & 0 & 0 & e^{j\phi_3} \end{bmatrix} \quad (6)$$

Figure 6:
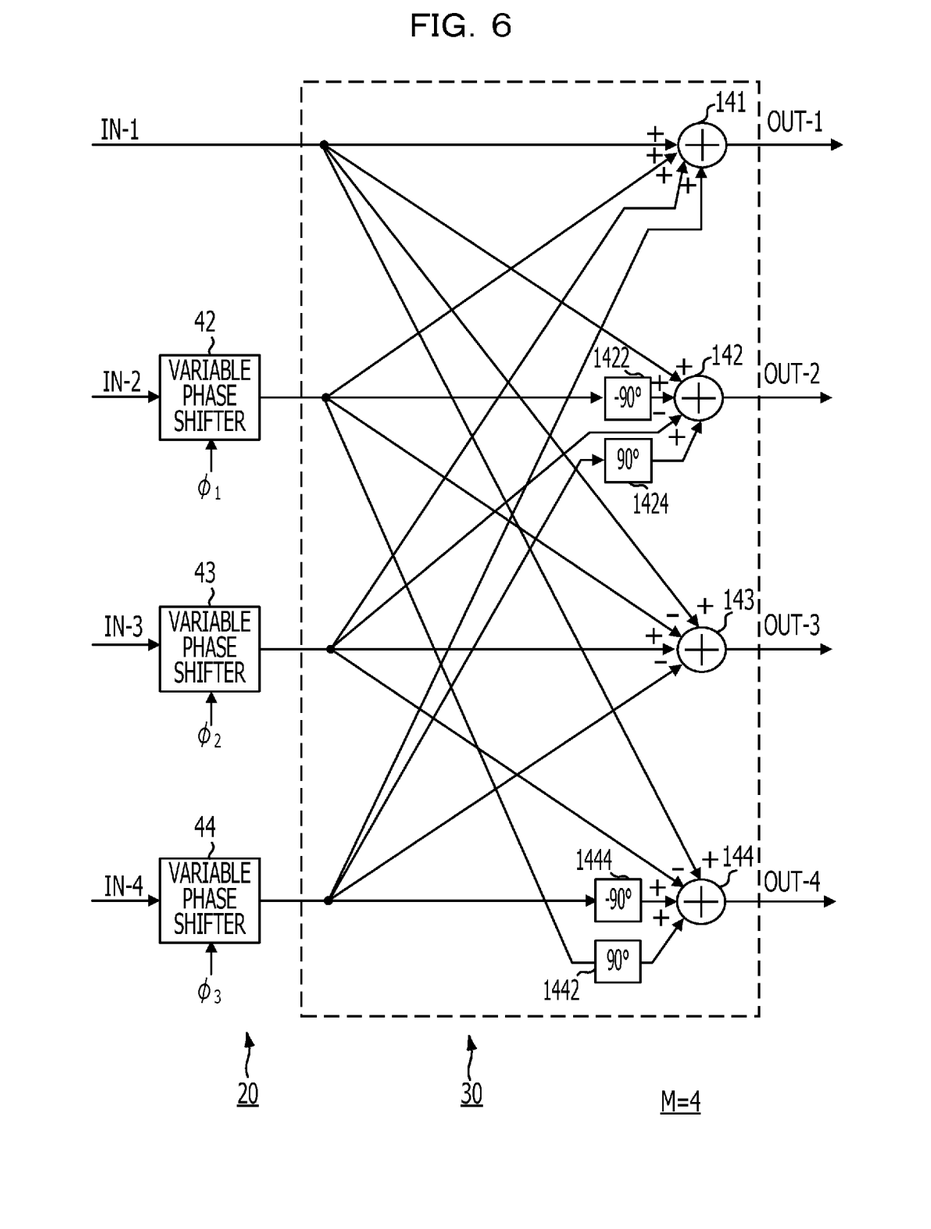
FIG. 6 illustrates an example of a configuration of a signal processing section of the relay station when M=4 in the second embodiment.

In order to achieve the above-described Expression 6, the signal processing section 15 of a relay station according to the present embodiment may employ an example of a configuration illustrated in FIG. 6.

In the signal processing section 15 illustrated in FIG. 6, the phase rotation section 20 includes a variable phase shifter 42, a variable phase shifter 43, and a variable phase shifter 44. The orthogonal transformation section 30 includes phase shifters 1422, 1424, 1444, and 1442, and calculation units 141, 142, 143, and 144.

The amount of phase rotation $\phi_1$ is given to the variable phase shifter 42 as a control result described in the first embodiment, and the phase of the input signal IN-2 is rotated by the amount of phase rotation $\phi_1$. The amount of phase rotation $4)_2$ is given to the variable phase shifter 43 as a control result described in the first embodiment, and the phase of the input signal IN-3 is rotated by the amount of phase rotation $4)_2$. The amount of phase rotation $\phi_3$ is given to the variable phase shifter 44 as a control result described in the first embodiment, and the phase of the input signal IN-4 is rotated by the amount of phase rotation $\phi_3$.

The phase shifter 1422 further performs phase rotation by −90 degrees on the input signal IN-2 having been subjected to the phase rotation performed by the variable phase shifter 42. The phase shifter 1424 further performs phase rotation by +90 degrees on the input signal IN-4 having been subjected to the phase rotation performed by the variable phase shifter 44. The phase shifter 1444 further performs phase rotation by −90 degrees on the input signal IN-4 having been subjected to the phase rotation performed by the variable phase shifter 44. The phase shifter 1442 further performs phase rotation by +90 degrees on the input signal IN-2 having been subjected to the phase rotation performed by the variable phase shifter 42.

The calculation unit 141 is an adder, and adds the input signal IN-1, the output signal of the variable phase shifter 42, the output signal of the variable phase shifter 43, and the output signal of the variable phase shifter 44 to generate an output signal OUT-1. The calculation unit 142 subtracts the output signal of the variable phase shifter 43 from the sum of the input signal IN-1, the output signal of the phase shifter 1442, and the output signal of the phase shifter 1424 to generate an output signal OUT-2. The calculation unit 143 subtracts the output signal of the variable phase shifter 42 and the output signal of the variable phase shifter 44 from the sum of the input signal IN-1 and the output signal of the variable phase shifter 43 to generate an output signal OUT-3. The calculation unit 144 subtracts the output signal of the variable phase shifter 43 from the sum of the input signal IN-1, the output signal of the phase shifter 1444, and the output signal of the phase shifter 1442 to generate an output signal OUT-4.

3. Third Embodiment

In the following, a description will be given of a relay station according to a third embodiment.

In the third embodiment, a description will be given of an example of a further specific configuration of the relay station and the advantages thereof with a special focus on the case where M=2.

3.1 Control in Relay Station

First, a description will be given of control of the amount of phase rotation in a relay station according to the present embodiment.

Figure 7:
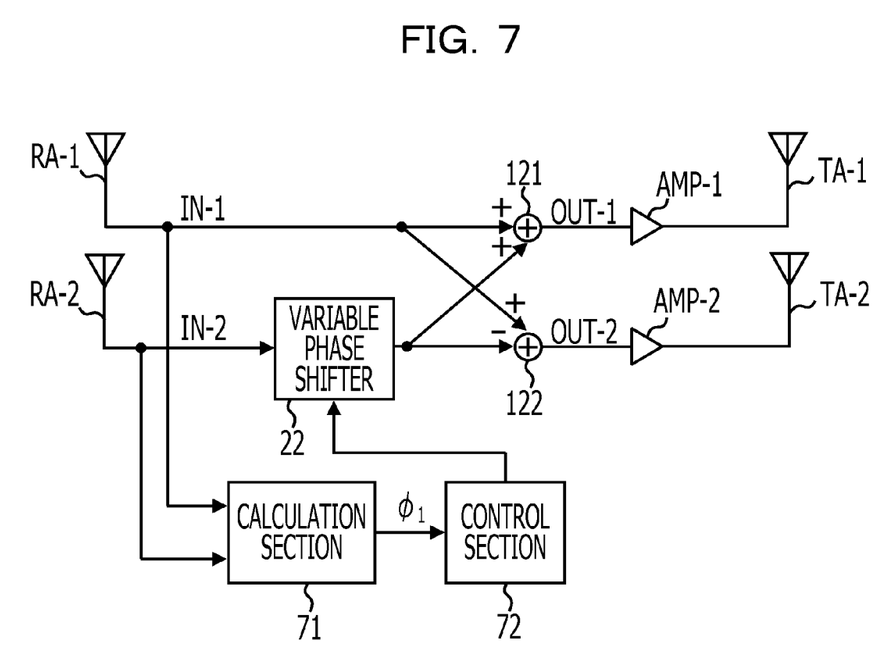
FIG. 7 illustrates an example of a configuration of a relay station in the case of employing feed-forward control as a method of controlling the amount of phase rotation in a third embodiment.
Figure 8:
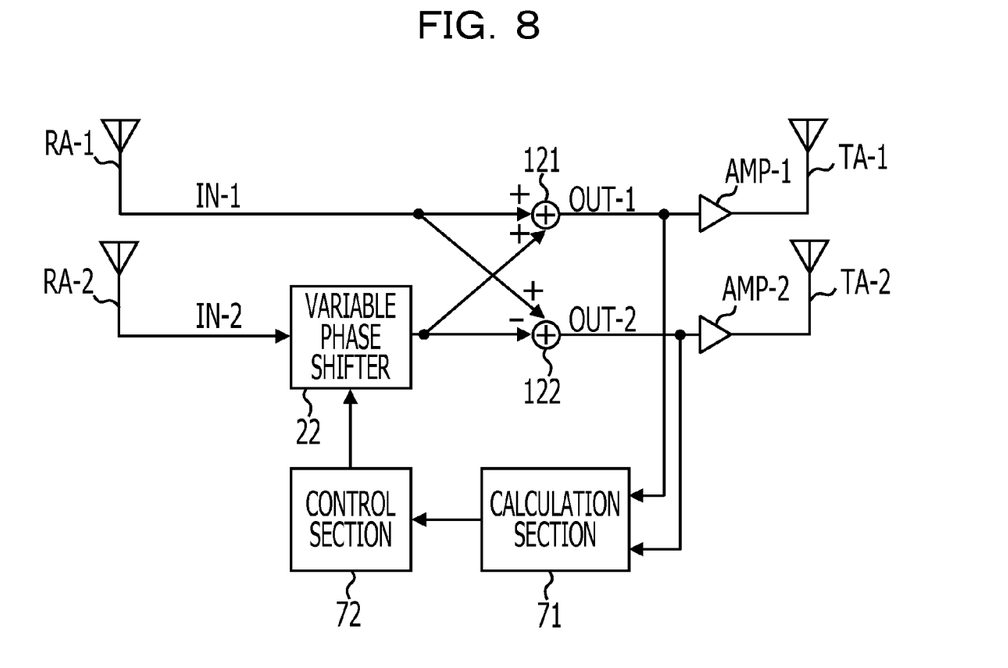
FIG. 8 illustrates an example of a configuration of a relay station in the case of employing feedback control as a method of controlling the amount of phase rotation in the third embodiment.
Figure 9:
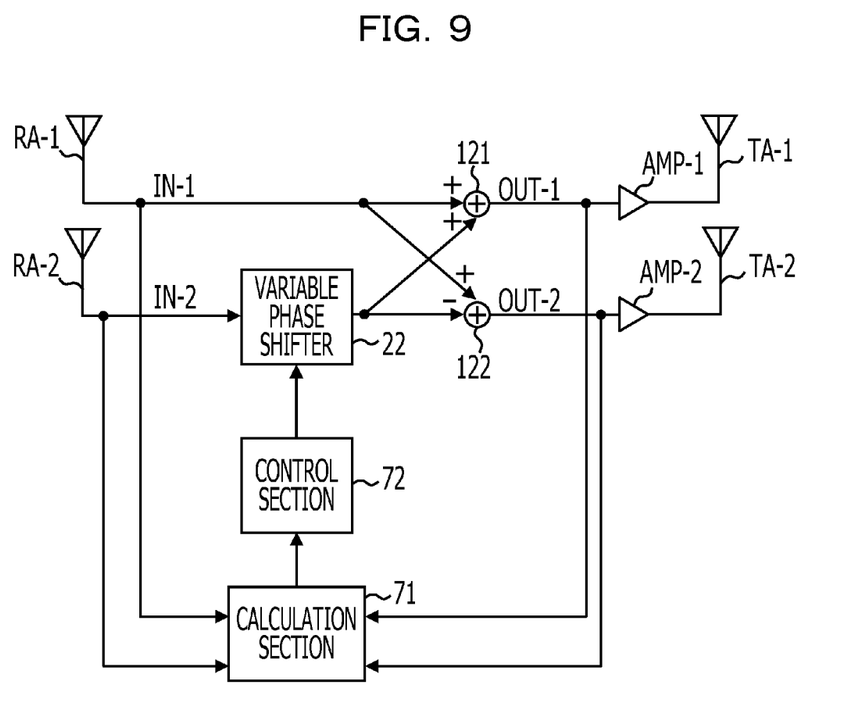
FIG. 9 illustrates an example of a configuration of a relay station in the case of employing feed-forward control and feedback control in combination as a method of controlling the amount of phase rotation in the third embodiment.

When M=2, as described in the first and the second embodiments, the amount of phase rotation $\phi_1$ is controlled. As described above, for a method of controlling the amount of phase rotation $\phi_1$, any one of the following may be employed: (A) Feed-forward control, (B) Feedback control, or (C) Combination of feed-forward control and feedback control. Each control of (A) to (C) may be suitably selected based on the system response, stability, etc. FIGS. 7 to 9 illustrate configurations corresponding to the individual control (A) to (C), respectively. In each of FIGS. 7 to 9, a phase rotation section 20 and an orthogonal transformation section 30 have the same configurations as those illustrated in FIG. 4, and are given the same reference letters and numerals as those in FIG. 4.

A. Feed-Forward Control

In order to calculate the amount of phase rotation $\phi_1$ with good precision, the feed-forward control is preferably performed based on a reference signal, such as a pilot, etc., transmitted from a base station. Thus, in a relay station illustrated in FIG. 7, a calculation section 71 calculates the amount of phase rotation $\phi_1$ based on the input signals IN-1 (first input signal) and IN-2 (second input signal) corresponding to the received signals of the reference signal. When M=2, calculation of the amount of phase rotation $\phi_1$ needs relatively a small amount of computational complexity. For example, if the input signals IN-1 and IN-2 are assumed to be expressed by the following Expression 7, the amount of phase rotation $\phi_1$ becomes as the following Expression 8.

[Expression 7]

$$IN-1 = A_1 e^{j(\omega t + \theta_1)}, \; IN-2 = A_2 e^{j(\omega t + \theta_2)} \qquad (7)$$

[Expression 8]

$$\phi_1 = \frac{\pi}{2}(\theta_2 - \theta_1) \qquad (8)$$

A control section 72 generates a control signal corresponding to the amount of phase rotation $\phi_1$ calculated by the calculation section 71, and gives the signal to a variable phase shifter 22. For example, if the variable phase shifter 22 is a voltage-controlled variable phase shifter, the control signal becomes a voltage-value signal in accordance with the amount of phase rotation $\phi_1$.

B. Feedback Control

In a relay station illustrated in FIG. 8, the calculation section 71 monitors the output signals OUT-1 and OUT-2, and gives a difference between the both voltage values to the control section 72. The control section 72 generates the control signal for the variable phase shifter 22 sequentially so as to make the difference of the average voltage levels zero. For example, if the variable phase shifter 22 is a voltage-controlled variable phase shifter, the control signal becomes a voltage-value signal in accordance with the amount of phase rotation $\phi_1$.

C. Combination of Feed-Forward Control and Feedback Control

In a relay station illustrated in FIG. 9, the calculation section 71 obtains the amount of phase rotation $\phi_1$ by the feed-forward control based on the input signals IN-1 and IN-2, and monitors output signals OUT-1 and OUT-2. And a difference between the amount of phase rotation $\phi_1$ and the average voltage level of the output signals OUT-1 and OUT-2 is given to the control section 72. The control section 72 generates a control signal in accordance with the amount of phase rotation $\phi_1$ calculated by the calculation section 71, and gives the signal to the variable phase shifter 22 as an initial value of the amount of phase rotation. Also, the control section 72 generates a control signal for the variable phase shifter 22 sequentially so as to make the difference of the average voltage levels zero. That is to say, in the relay station illustrated in FIG. 9, basically the amount of phase rotation $\phi_1$ is obtained by the feed-forward control to perform initial settings, and the feed-back control is complementarily used.

3.2 Example of Configuration Relay Station

FIGS. 10A and 10B, and FIGS. 11A and 11B illustrate an example of configuration of a relay station according to the present embodiment.

Figure 10A:
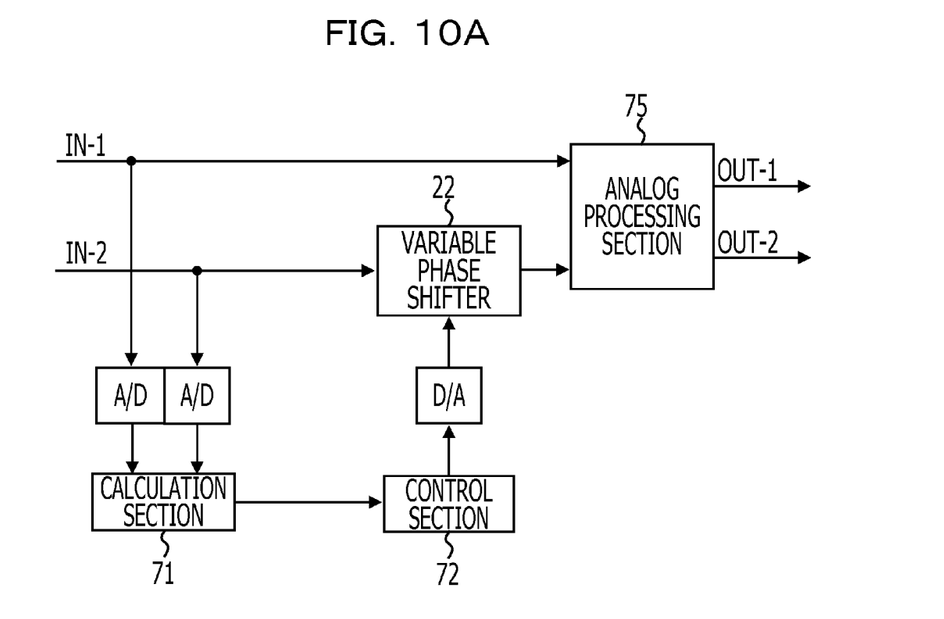
FIGS. 10A and 10B illustrate an example of a configuration of a relay station in the case of employing feed-forward control as a method of controlling the amount of phase rotation in the third embodiment.
Figure 10B:
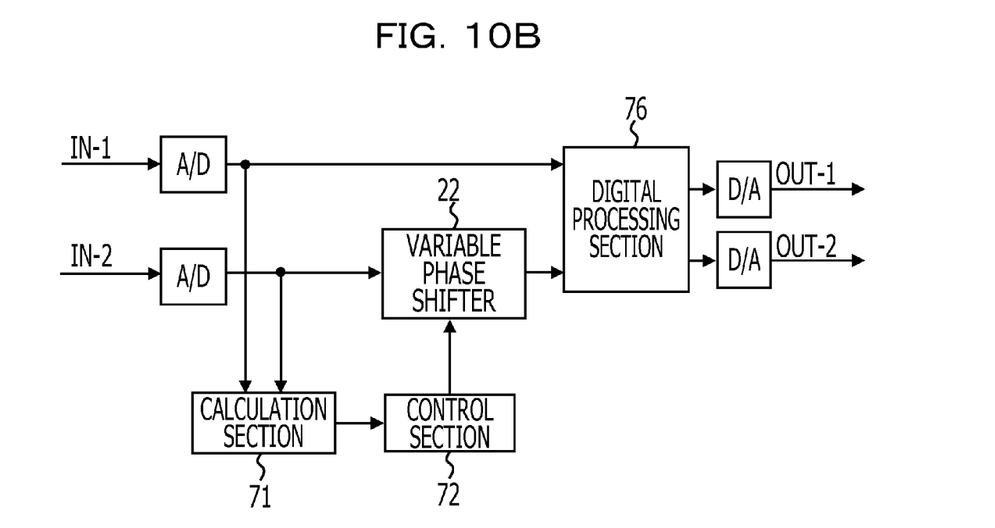

FIGS. 10A and 10B are examples of a configuration when feed-forward control is employed as a method of controlling the amount of phase rotation $\phi_1$. FIG. 10A illustrates a configuration when orthogonal transformation is performed by analog processing, and FIG. 10B illustrates a configuration when orthogonal transformation is performed by digital processing.

In the example illustrated in FIG. 10A, input signals IN-1 and IN-2 are subjected to A/D (Analog to Digital) conversion. A calculation section 71 calculates the amount of phase rotation $\phi_1$ based on a digital value of each of the input signals, and a control section 72 determines a target-control voltage (digital value) corresponding to the amount of phase rotation $\phi_1$. The target-control voltage is subjected to D/A (Digital to Analog) conversion, and is given to a variable phase shifter 22. An analog processing section 75 includes, for example a hybrid circuit, and performs analog operation corresponding to addition/subtraction (refer to FIG. 7) performed by the adder 121 and the subtractor 122.

On the other hand, in the example illustrated in FIG. 10B, in the same manner as FIG. 10A, the calculation section 71 calculates the amount of phase rotation $\phi_1$ based on the digital value of the individual input signals, and the control section 72 determines the target-control voltage (digital value) corresponding to the amount of phase rotation $\phi_1$. Here, the variable phase shifter 22 is configured by a digital circuit. The digital processing section 76 performs digital processing corresponding to the addition/subtraction (refer to FIG. 7) performed by the adder 121 and the subtractor 122. Output signals OUT-1 and OUT-2 (digital) obtained by the digital processing section 76 are then subjected to D/A conversion, and are directed to individual power amplifiers.

Figure 11A:
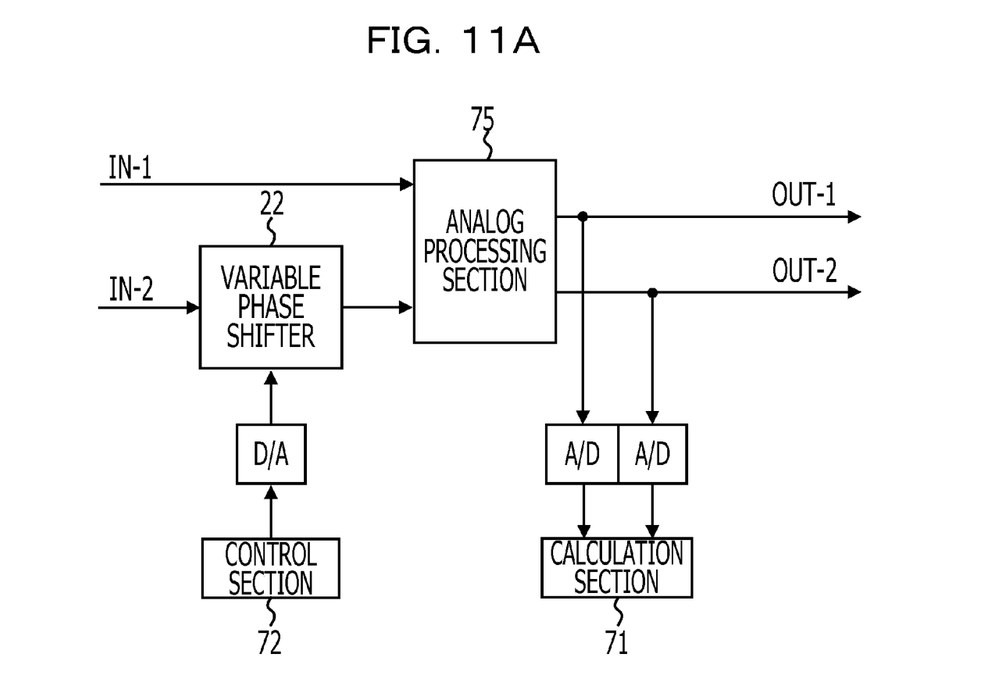
FIGS. 11A and 11B illustrate an example of a configuration of a relay station in the case of employing feedback control as a method of controlling the amount of phase rotation in the third embodiment.

FIGS. 11A and 116 are examples of a configuration when feedback control is employed as a method of controlling the amount of phase rotation $\phi_1$. FIG. 11A illustrates a configuration when orthogonal transformation is performed by analog processing, and FIG. 11B illustrates a configuration when orthogonal transformation is performed by digital processing.

In FIG. 11A, the analog processing section 75 is formed, for example by a hybrid circuit, and performs analog operation corresponding to the addition/subtraction (refer to FIG. 7) performed by the adder 121 and the subtractor 122. Output signals OUT-1 and OUT-2 (analog) from the analog processing section 75 are subjected to A/D conversion, and then are fed back. In this regard, in FIG. 11A, the variable phase shifter 22 is formed by an analog circuit.

Figure 11B:
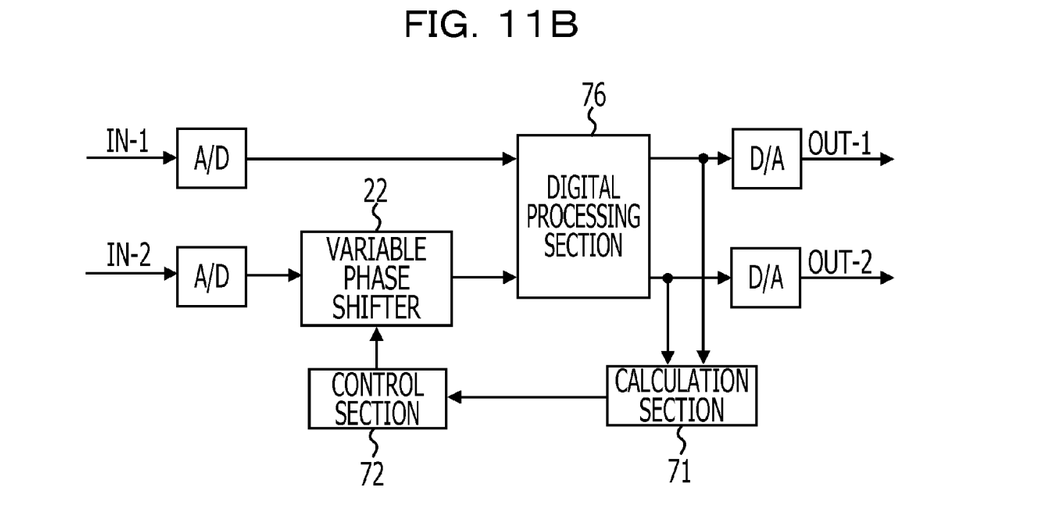

In FIG. 11B, the digital processing section 76 performs digital processing corresponding to the addition/subtraction (refer to FIG. 7) performed by the adder 121 and the subtractor 122. The output signals OUT-1 and OUT-2 (digital) from the digital processing section 76 are directly fed back. The output signals OUT-1 and OUT-2 (digital) obtained by the digital processing section 76 are then are subjected to D/A conversion to be directed to individual power amplifiers. In this regard, in FIG. 11B, the variable phase shifter 22 is formed by a digital circuit.

3.3 An Example of Advantages of Relay Station According to the Present Embodiment Next, with reference to FIG. 12, a description will be given of an example of advantages of a relay station according to the present embodiment. In this regard, an advantage described here is only an example, and a degree of the actual advantages may be varied depending on a communication specification including an applied wireless frequency band, configurations of a receiving system and a transmission system in the relay station, a characteristic of a power amplifier, etc.

Figure 12:
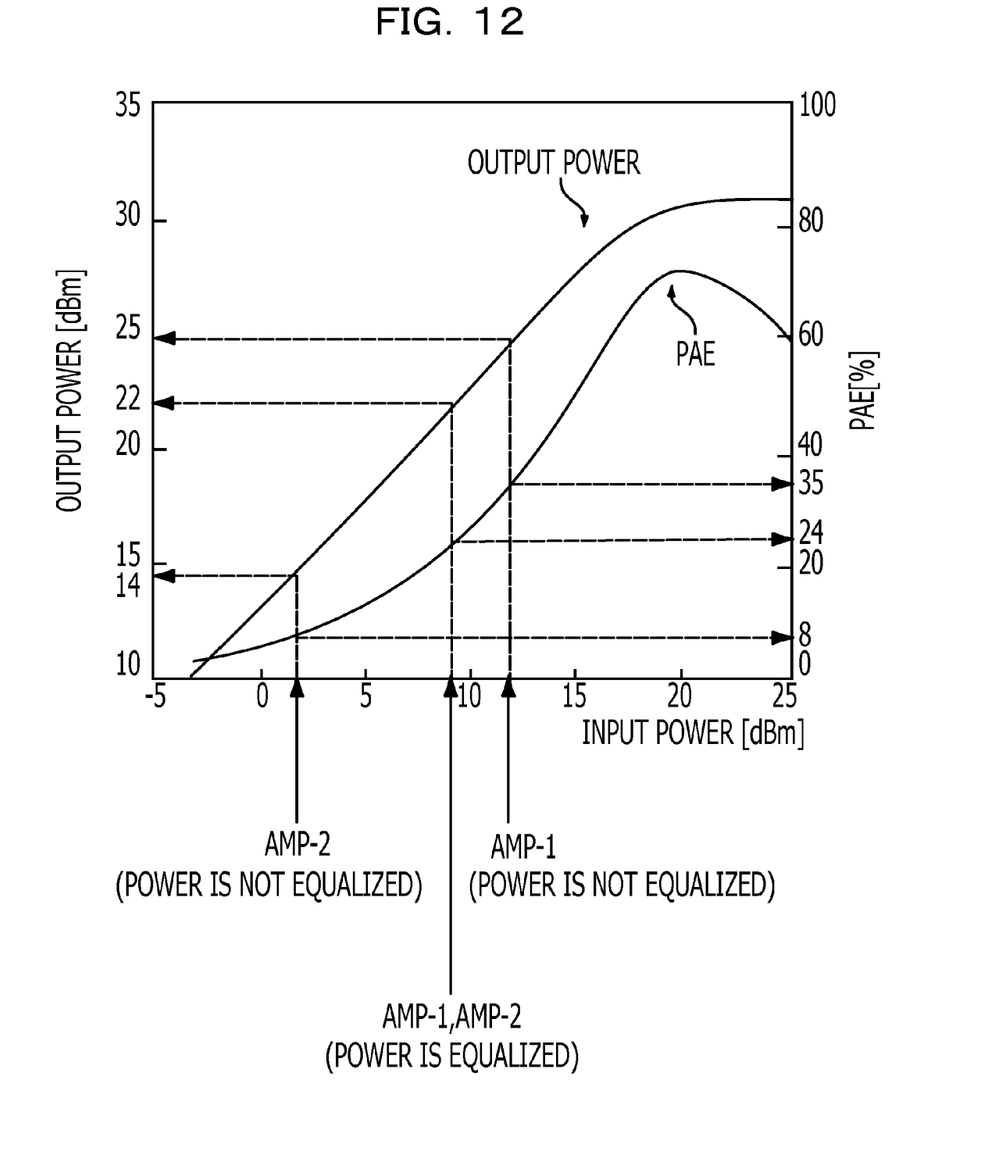
FIG. 12 illustrates a graph illustrating advantages of a relay station according to the third embodiment.

FIG. 12 illustrates a graph indicating an example of a characteristic of a typical power amplifier. A relationship between input power and output power, and a relationship between input power and power added efficiency (PAE) are illustrated. In this regard, a power added efficiency is an index indicating efficiency of conversion of DC power supplied to a power amplifier into RF output power, and represented by (RF output power−RF input power)/(supplied DC power).

In FIG. 12, the case where output signals OUT-1 and OUT-2 supplied to the power amplifiers AMP-1 and AMP-2, respectively, are not equalized (made to have the same average power level) and the case of being equalized are illustrated individually.

Here, it is estimated that a difference of input power in the case of not equalizing the output signals OUT-1 and OUT-2 is about 10 dB. This results from the fact that a difference of received power between the receiving antennas RA-1 and RA-2 is considered to be about 10 dB in consideration of variations of the receiving antennas RA-1 and RA-2, influence of shadowing by a distance of the individual antennas, influence of fading, etc. The difference of 10 dB directly results in a difference of input power to the power amplifiers AMP-1 and AMP-2.

First, when the output signals OUT-1 and OUT-2 are not power-equalized, the output power of the power amplifier AMP-1 becomes 25 dBm, the PAE thereof becomes 35%, the output power of the power amplifier AMP-2 becomes 14 dBm, and the PAE thereof becomes 8%.

On the other hand, when the output signals OUT-1 and OUT-2 are power-equalized, for both of the power amplifiers AMP-1 and AMP-2, the output power becomes 22 dBm, and the PAE becomes 24%.

That is to say, when power equalization is carried out, the PAE for each one power amplifier increased by 2.5%, and the sum of output power of the two power amplifiers increased by 5 dB as compared with the case of not equalizing power. Accordingly, by equalizing power, it is possible to increase the efficiency of the individual power amplifiers of the relay station, and to increase the total transmission power of the relay station. Thereby, it is possible to enlarge a relay-allowed area of the receiving station.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that various changes, substitutions, and alterations could be made hereto without departing from the spirit and scope of the invention.

The invention claimed is:

1. A wireless relay apparatus relaying wireless communication between a transmission station and a receiving station, the wireless relay apparatus comprising:
   M (M is an integer >1) receiving antennas receiving a radio signal from the transmission station;
   a signal processing section performing orthogonal transformation and phase rotation on M received signals received by each of the receiving antennas as an input signal so as to obtain M output signals having a same average power level; and M transmission antennas individually transmitting the M output signals obtained by the signal processing section to the receiving station.

2. The wireless relay apparatus according to claim 1, wherein if amounts of phase rotation for second to M-th input signals are assumed to be $\phi_1$ to $\phi_{M-1}$, respectively out of a first to M-th input signals, the signal processing section processes the M input signals to obtain the M output signals by applying a matrix operation of:

$$\frac{1}{\sqrt{M}}\begin{bmatrix} 1 & 1 & 1 & \cdots & 1 \\ 1 & e^{-j\frac{2\pi}{M}} & e^{-j\frac{2\pi}{M}2} & \cdots & e^{-j\frac{2\pi}{M}(M-1)} \\ 1 & e^{-j\frac{2\pi}{M}2} & e^{-j\frac{2\pi}{M}4} & \cdots & e^{-j\frac{2\pi}{M}2(M-1)} \\ \vdots & \vdots & \vdots & \ddots & \vdots \\ 1 & e^{-j\frac{2\pi}{M}(M-1)} & e^{-j\frac{2\pi}{M}2(M-1)} & \cdots & e^{-j\frac{2\pi}{M}(M-1)^2} \end{bmatrix}$$

$$\begin{bmatrix} 1 & 0 & 0 & \cdots & 0 \\ 0 & e^{j\phi_1} & 0 & \cdots & 0 \\ 0 & 0 & e^{j\phi_2} & \cdots & 0 \\ \vdots & \vdots & \vdots & \ddots & \vdots \\ 0 & 0 & 0 & \cdots & e^{j\phi_{M-1}} \end{bmatrix}.$$

3. The wireless relay apparatus according to claim 2, wherein the signal processing section determines the amounts of phase rotation by feed-forward control based on the input signals.

4. The wireless relay apparatus according to claim 2, wherein the signal processing section determines the amounts of phase rotation by feedback control from the output signals.

5. The wireless relay apparatus according to claim 2, wherein the signal processing section determines the amounts of phase rotation by feed-forward control based on the input signals and feedback control from the output signals.

6. The wireless relay apparatus according to claim 2, wherein when M is 2, the signal processing section inputs a first input signal and a second input signal, and includes
a variable phase shifter shifting a phase of the second input signal by a desired amount to generate a desired phase shifted signal,
an adder adding the first input signal and the phase shifted signal to generate a first output signal, and
a subtractor subtracting the phase shifted signal from the first input signal to generate a second output signal.

7. A method of relaying a signal wirelessly in a wireless relay apparatus disposed between a transmission station and a receiving station, the method comprising:
receiving a radio signal from the transmission station by M (M is an integer >1) receiving antennas;
performing orthogonal transformation and phase rotation on M received signals received by each of the receiving antennas as an input signal so as to obtain M output signals having a same average power level; and
individually transmitting the M output signals to the receiving station by the M receiving antennas.

8. The method of relaying a signal wirelessly according to claim 7, wherein if amounts of phase rotation for a second to M-th input signals are assumed to be $\phi_1$ to $\phi_{M-1}$, respectively out of a first to M-th input signals, and obtaining M output signals having a same average power level by processing the M input signals by applying a matrix operation of:

$$\frac{1}{\sqrt{M}}\begin{bmatrix} 1 & 1 & 1 & \cdots & 1 \\ 1 & e^{-j\frac{2\pi}{M}} & e^{-j\frac{2\pi}{M}2} & \cdots & e^{-j\frac{2\pi}{M}(M-1)} \\ 1 & e^{-j\frac{2\pi}{M}2} & e^{-j\frac{2\pi}{M}4} & \cdots & e^{-j\frac{2\pi}{M}2(M-1)} \\ \vdots & \vdots & \vdots & \ddots & \vdots \\ 1 & e^{-j\frac{2\pi}{M}(M-1)} & e^{-j\frac{2\pi}{M}2(M-1)} & \cdots & e^{-j\frac{2\pi}{M}(M-1)^2} \end{bmatrix}$$

$$\begin{bmatrix} 1 & 0 & 0 & \cdots & 0 \\ 0 & e^{j\phi_1} & 0 & \cdots & 0 \\ 0 & 0 & e^{j\phi_2} & \cdots & 0 \\ \vdots & \vdots & \vdots & \ddots & \vdots \\ 0 & 0 & 0 & \cdots & e^{j\phi_{M-1}} \end{bmatrix}.$$

9. The method of relaying a signal wirelessly according to claim 8 further comprising:
determining the amounts of phase rotation by feed-forward control based on the input signals.

10. The method of relaying a signal wirelessly according to claim 8 further comprising:
determining the amounts of phase rotation by feedback control from the output signals.

11. The method of relaying a signal wirelessly according to claim 8 further comprising:
determining the amounts of phase rotation by feed-forward control based on the input signals and feedback control from the output signals.

12. The method of relaying a signal wirelessly according to claim 7, wherein when M is 2, performing orthogonal transformation and phase rotation on a first input signal and a second input signal received by each of the receiving antennas, includes:
shifting a phase of the second input signal by a desired amount to generate a desired phase shifted signal,
adding the first input signal and the phase shifted signal to generate a first output signal, and
subtracting the phase shifted signal from the first input signal to generate a second output signal.

* * * * *